United States Patent [19]

Sanderson

[11] Patent Number: 5,595,662
[45] Date of Patent: Jan. 21, 1997

[54] WATER PURIFICATION DEVICE

[75] Inventor: Ronald D. Sanderson, Stellenbosch, South Africa

[73] Assignee: Water Research Commission, South Africa

[21] Appl. No.: 517,190

[22] Filed: Aug. 21, 1995

[30] Foreign Application Priority Data

Aug. 19, 1994 [ZA] South Africa ............................ 94/6328

[51] Int. Cl.⁶ ............................ B01D 15/00; B01D 35/18
[52] U.S. Cl. ............... 210/640; 210/321.75; 210/321.74; 210/175; 210/180; 210/900; 210/486; 96/4; 203/10; 202/200
[58] Field of Search ................................ 210/640, 257.2, 210/321.75, 321.84, 175, 180, 900, 486, 244; 96/4, 6, 7, 9; 203/10; 202/172, 177, 180, 200

[56] References Cited

U.S. PATENT DOCUMENTS

| | | | |
|---|---|---|---|
| 3,385,769 | 5/1968 | Brose ..................................... | 210/640 |
| 4,419,187 | 12/1983 | Cheng et al. ................................ | 96/4 |
| 4,419,242 | 12/1983 | Cheng et al. ................................ | 96/4 |
| 4,781,837 | 11/1988 | LeFeyre ................................. | 210/640 |
| 4,879,041 | 11/1989 | Kurukawa et al. ...................... | 210/900 |
| 5,100,544 | 3/1992 | Izutani et al. ........................... | 210/640 |
| 5,236,474 | 8/1993 | Schofield et al. ........................... | 95/47 |
| 5,296,144 | 3/1994 | Sternina et al. ......................... | 210/640 |
| 5,385,672 | 1/1995 | Peterson et al. ......................... | 210/640 |

OTHER PUBLICATIONS

P. A. Hogan, et al; "Solar Membrane Distillation" NERDDC Project No. 1281, University of New South Wales, Australia, Final Report, Jun. 19, 1992.
K. Ohta, et al; "Membrane Distillation with Fluoro-carbon Membranes" Institue of Chemical Engineers Symposium Series, vol. 1, No. 125, 1991, pp. 107–115.
A. G. Fane, et al; "The Efficient Use of Energy in Membrane Distillation" Desalination, Elsevier Science Publishers, 64(1987) pp. 231–243.
R. W. Schofield, et al; "Heat and Mass Transfer in Membrane Distillation" Journal of Membrane Science, 33(1987), Elsevier Science Publishers pp. 299–313.
E. Drioli, et al; "Membrane Distillation in the Treatment of Aqueous Solutions" Journal of Membrane Science, 33(1987), Elsevier Science Publishers pp. 277–284.
S. Kimura, et al; "Transport Phenomena in Membrane Distillation" Journal of Membrane Science, 33 (1987), Elsevier Science Publishers pp. 285–298.
S. Kimura, et al; "Transport Phenomena in Membrane Distillation" Desalination, Elsevier Science Publishers 1987 pp. 285–297.
S. I. Andersson, et al; "Design and Field Test of a New Membrane Distillation Desalination Process" Desalination, Elsevier Science Publishers, 56(1985) pp. 345–354.
A. S. Jönsson, et al; "Membrane Distillation—A Theoretical Study of Evaporation Through Microporous Membranes", Desalination, Elsevier Science Publishers, 56(1985) pp. 237–249.
S. Bandini, et al; "Role of Heat and Mass Transfer in Membrane Distillation Process", Desalination, Elsevier Science Publishers, 81(1991) pp. 91–105.
I. Basini, et al; "A Desalination Process Through Sweeping Gas Membrane Distillation", Desalination, Elsevier Science Publishers, 64(1987) pp. 245–257.

*Primary Examiner*—Ana Fortuna
*Attorney, Agent, or Firm*—Dvorak and Traub

[57] ABSTRACT

A water purification device comprises a compartment for holding a supply of impure water; a purified water collection zone; and a dense hydrophilic membrane between the compartment and the purified water collection zone. The membrane is capable of functioning by membrane distillation. A water vapour condensing surface is provided in the purified water collection zone. The condensing surface is spaced from the membrane.

9 Claims, 2 Drawing Sheets

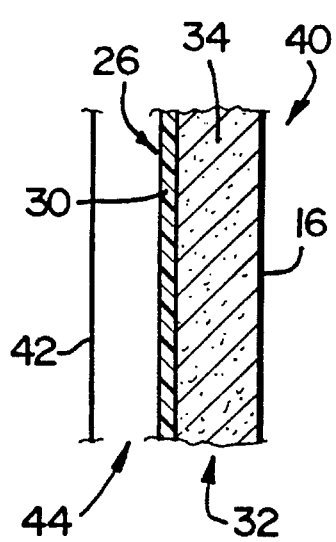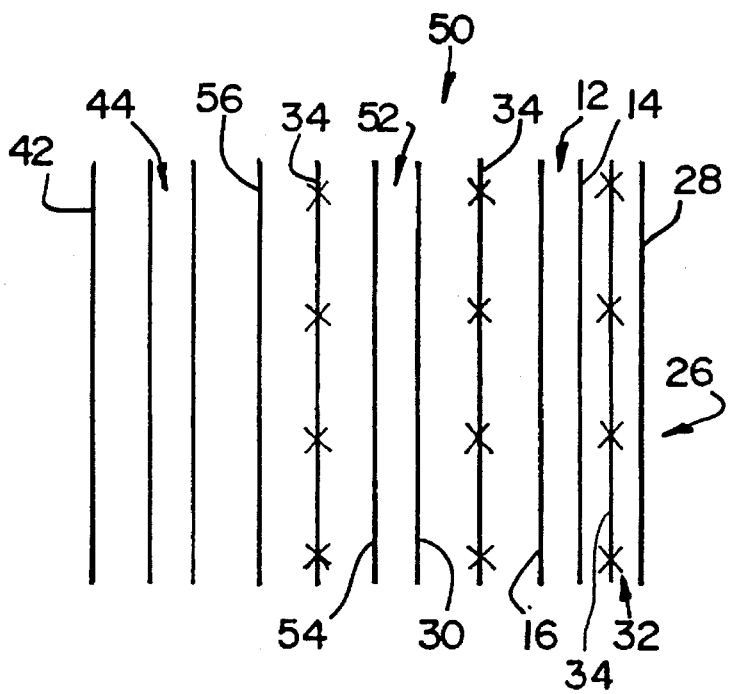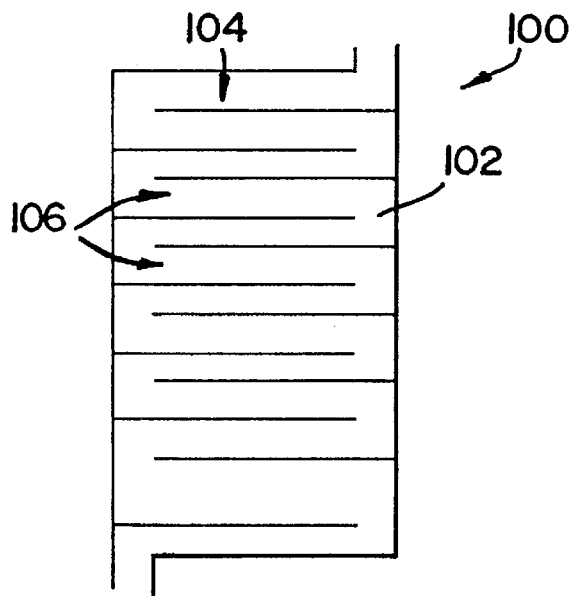

WATER PURIFICATION DEVICE

THIS INVENTION relates to a water purification device.

According to the invention, there is provided a water purification device, which comprises a compartment for holding a supply of impure water; a purified water collection zone; a dense hydrophilic membrane between the compartment and the purified water collection zone, the membrane being capable of functioning by membrane distillation; and a water vapour condensing surface in the purified water collection zone, with the condensing surface being spaced from the membrane.

Thus, in use, water vapour which passes through the membrane condenses against the condensing surface, and purified water thus collects in the purified water collection zone.

A gap is thus provided between the membrane and the condensing surface in the purified water collection zone; however, the membrane is contacted directly by impure water contained in the compartment. The gap may be an air gap so that the membrane more particularly functions by means of so-called air gap membrane distillation. In use, water vapour permeates through the membrane from the compartment to the purified water collection zone, with water thereby being separated from any non-volatile components present in the impure water. In other words, the membrane acts as a physical support for the vapour-liquid interface.

The membrane is, as mentioned, dense or substantially non-porous. In particular, it is characterized thereby that it contains substantially no pores having diameters which are in the microfiltration range. Furthermore, the membrane is, as also mentioned, hydrophilic or wettable. In particular, the membrane may be of polymeric material such as polyurethane or the like. If necessary, e.g. for greater strength, the membrane may be laminated to a suitable support, such as cloth. Suitable cloths are available from Lanier de Picardie or DuPont in France. In particular, laminated cloth obtainable under the trade name Skinline 8183 from Lanier de Picardie in France or that obtainable under the trade name Coolmax from DuPont in France, can be used as supported membranes. If desired, the laminated cloths can be used in the form of a double layer in which the membranes of the double cloth layers abut each other.

Membrane distillation requires a higher temperature in the impure water compartment or zone and a cooler temperature in the purified water collection zone, to provide the required driving force for the distillation. The device may thus be adapted so that the impure water compartment or zone is capable of being heated up by solar energy, body heat, or the like. Thus, the membrane may be radiation-absorbent.

The membrane may, in particular, be flexible and may be in the form of a bag. To enhance radiation absorbency, the bag may be black, and may be in the form of a sachet having front and rear panels joined along their peripheries, a base and an upper end having a filler opening leading into the compartment. If desired, one of the panels, e.g. the front panel, may instead be of non-permeable material.

The device may include a plastics cover supported over the bag, e.g. covering the bag, and spaced therefrom so that the cover provides the condensing surface and with the air gap being provided between the bag and the plastics cover. In other words, the purified water collection zone is provided between the cover and the bag.

A thin layer of highly porous spacing material may be provided in the air gap, with this material abutting the bag and the plastics cover.

The cover may be transparent or clear. In one embodiment, the cover may be flexible, e.g. it may be in the form of a flexible sheet. However, instead, the cover may be rigid, eg it may be in the form of panels adjacent the front and rear panels of the sachet. Preferably the plastics cover is made of polyvinyl chloride which, in use, can act as an insulation layer to retain the absorbed heat within the device.

The cover may include protrusions protruding from its condensing surface so that the protrusions serve to space the cover from the bag. The protrusions may be in the form of dimples and/or ridges which provide spot contact with the bag and, in use, the dimpled or ridged cover may be used without a spacing material between the cover and the bag, as the dimples or ridges on the cover space the cover from the bag to provide the air gap.

In use, impure water, such as salt water, e.g. sea or brack water, or polluted water, is introduced into the membrane bag. The device is located such that its front panel faces towards the sun. Sunlight enters through the plastics sheet, and is absorbed by the black membrane bag, which in turn heats the water. Water permeates or evaporates from the front and rear panels, and condenses against the cooler inner surfaces of the plastics sheet, especially the portion thereof adjacent the rear panel of the bag. This condensed water collects at a low point in the purified water collection zone provided between the bag and the plastics sheet in an area arranged to facilitate collection and/or drainage of the purified water.

The device may include, adjacent a rear portion of the plastics cover covering the rear panel of the bag, a further or second similar flexible substantially non-porous hydrophilic membrane and a further or second similar plastics cover supported over this membrane and spaced therefrom, so that a second membrane bag, in addition to the other or first membrane bag, is defined between the further membrane and the rear portion of the other or first plastics cover. Thus, in use, as water vapour from the first membrane bag condenses on the condensing surface provided by the rear portion of the first plastics cover, the heat of condensation is used to heat up impure water in the second membrane bag. In this fashion, latent heat of vaporization is re-used to provide greater efficiency. Naturally, still further similar membranes, each having its own plastics cover and defining a further membrane bag with the rear portion of the plastics cover of an adjacent bag, may be provided adjacent one another, in similar fashion.

The device may include an evaporative cooling layer or membrane adjacent the rear portion of the plastics cover of the membrane bag or, when present, that of the further or second membrane bag. This enhances efficiency. The evaporative cooling membrane may be of canvas, or the like.

The device may include a preheater for preheating water introduced into the membrane bag(s). The or each preheater may be connected to, or may be integral with, the or each membrane bag. The or each preheater may comprise an absorbent plastics base, e.g. a black plastics base, and a plastics sheet, e.g. a clear plastics sheet, attached, eg welded, to the base in such fashion that water channels are provided between the sheets.

If desired, a second clear plastics sheet can be supported over the other or first clear plastics sheet to reduce heat loss.

In use, solar radiation passes through the second and first plastics sheets, and is absorbed by the black plastics sheet, thereby causing water in the channels to be heated.

The device can thus be of such a size that it can easily be carried around, e.g. be of pocket size, or possibly slightly longer. Due to the flexibility of the various components, it can be folded into a small package, and can thus be in the form of a rescue bag.

In another version of the invention, the device may be of elongate form, with the membrane bag and plastics sheet thus being of tubular form, and with the membrane bag being located inside the plastics sheet. The materials can then be such that the clear plastics tube can be inflated, to render the device into an operative configuration.

The invention will now be described by way of example with reference to the accompanying diagrammatic drawings.

BRIEF DESCRIPTION OF THE DRAWINGS

FIG. 5 shows a view similar to that of FIG. 3 of a device according to another embodiment of the invention;

FIG. 6 shows a view similar to that of FIG. 3 of a device according to yet another embodiment of the invention; and FIG. 7 shows a plan view of a preheater for use with the water purification devices of FIGS. 1, 2, 3, 4 and 5.

DETAILED DESCRIPTION

Figure 1:
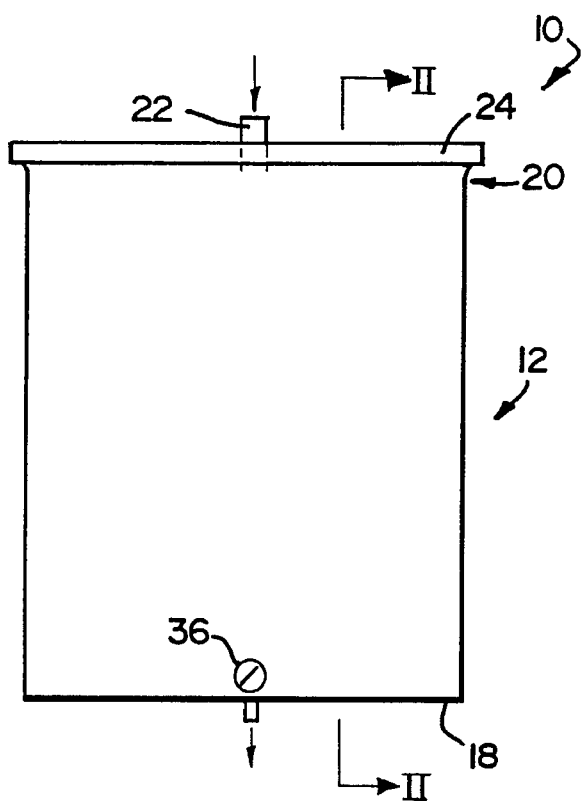
FIG. 1 shows a front view of a water purification device according to one embodiment of the invention.
Figure 2:
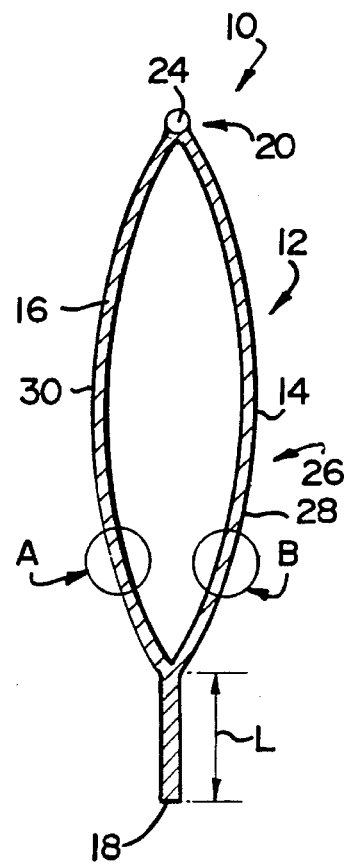
FIG. 2 shows a sectional view through II—II in FIG. 1.
Figure 3:
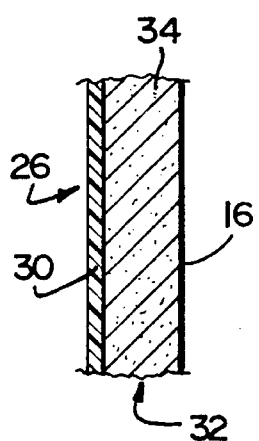
FIG. 3 shows an enlarged view of the portion of the bag marked A in FIG. 2.
Figure 4:
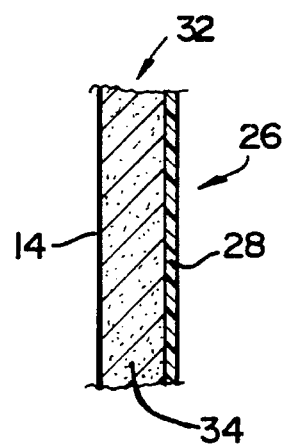
FIG. 4 shows an enlarged view of the portion of the bag marked B in FIG. 2.

Referring to FIGS. 1 to 4, reference numeral 10 generally indicates a water purification device according to one embodiment of the invention.

The device 10 includes a black radiation absorbent membrane bag 12. The bag 12 is of sachet form, and has a front panel 14 and a rear panel 16 spaced from the front panel. The panels 14, 16 are sealed along their peripheries so that the bag has an extended base 18 having a length designated "L" and an operative upper end 20 spaced from the base, with a water filling nozzle 22 provided in the upper end. Optionally, the front panel 14 can be made from a dark non-permeable plastics material. A support rod 24 extends along the upper end 20. The panels 14, 16 of the membrane bag 12 each comprise a substantially non-porous hydrophilic membrane laminated to cloth as a physical support to prevent the membrane from easily being damaged.

The membranes should be chemically resistant, structurally strong, heat resistant, and repellent to impurities in mother liquids, ie the liquid to be purified. The membranes can be of substantially non-porous hydrophilic polyurethane or poly(ether block polyamide), e.g. such as that sold under the trade name PEBAX available from Atochem in Germany or France. Thus, laminated cloths such as those available under the trade names Skinline 8183 and Coolmax as hereinbefore described, can be used for the panels 14, 16.

A clear plastics sheet 26, e.g. of PVC, is supported over the bag 12 such that it is spaced from the bag 12, and has a front portion 28 adjacent the front panel 14 and a rear portion 30 adjacent the rear panel 16. Thus, an air gap 32 is provided between the plastics sheet 26 and the bag 12.

The air gap 32 is filled with a thin layer of highly porous spacing material 34.

In use, impure water, such as sea water, is introduced into the membrane bag 12. The device 10 is located such that the front panel 14 of the bag faces the sun. Sunlight enters through the front portion 28 of the plastics sheet 26, and is absorbed by the black membrane bag 12, which in turn heats up the impure water. Water evaporates from the front and rear panels 14, 16 of the bag (or only from the rear panel 16 when the front panel 14 is made from non-permeable plastics material), and condenses on the cooler surfaces of the plastics sheet 26, especially the rear portion 30 thereof. The condensate or permeate runs down to the base of the device 10, where it collects, and can be withdrawn through a closeable outlet 36. Naturally, the length L of the base 18 is selected to provide sufficient space or volume at the base of the device 10 for the permeate to collect.

The permeate produced is of a very high purity, and contains substantially no non-volatile solutes.

Confidential tests were conducted on laboratory apparatus simulating the device of FIGS. 1 to 4. In these tests, the production rate of potable water as a function of the temperature of the heated impure water, as well as the temperature of the condensate, were investigated.

In the tests, non-porous hydrophilic polyurethane membranes having a thickness of 12 microns, ie $1,2 \times 10^{-6}$ m, were used. Two types of membrane structures, ie supported membranes, were used. One structure comprised cloth laminated to both sides of the polyurethane membrane, while the other structure comprised cloth laminated to one side of the membrane only. More specifically, laminated cloths obtained under the tradename Coolmax were used as the membrane structures.

In a first experiment that was conducted, the temperature of the condensing surface, which is equivalent to the rear portion 30 of the clear plastics sheet 26, was kept at a constant temperature of 14° C., while the impure water temperature was varied. The membrane system used was the cloth laminated to both sides of the polyurethane membrane.

The following results were obtained:

TABLE 1

| $T_{salt\ water}$ (°C.) | Condensate (ml/(h · m²)) |
|---|---|
| 50 | 74,1 |
| 54 | 78 |
| 60 | 160,7 |
| 62 | 183,5 |
| 65 | 192,7 |
| 76 | 330,3 |

In a second experiment, the influence of the temperature of the condensing surface was investigated, with the salt water temperature being kept constant at 65° C.

The results are set out in Table 2:

TABLE 2

| $T_{condensing\ surface}$ (°C.) | Condensate (ml/(h · m²)) |
|---|---|
| 13 | 204,5 |
| 15 | 192,7 |
| 19 | 183,5 |

In a third experiment, the effect of the laminated cloth on the permeate flux was investigated, In other words, it was investigated whether the laminated cloth acted as an extra resistance for mass transfer through the membrane.

These results are set out in Table 3:

TABLE 3

| $T_{salt\ solution}$ (°C.) | Condensate (ml/h · m²)) |
|---|---|
| 48 | 517,1 |
| 57 | 587,2 |
| 61 | 652,4 |

From these tests, it can be seen that the temperature of the salt water is important for the permeate production rate. Still further, the laminated cloth has an influence on the diffusion rate of the water vapour. Thus, the laminated cloth adds to the resistance against mass transfer through the membrane, and ideally the membrane should be used without any protective cloth. However, since the membrane has a thickness of only 12 microns, some form of protection is required.

The effect of changes in temperature on the condensing surface is not as significant as the temperature of the impure water.

A major advantage of the device 10 is that it can be placed at an optimum solar incidence angle towards the sun so as to increase the amount of radiation absorbed per square meter of membrane area. In the absence of sunlight an alternate heat source can be used, such as by holding the front panel 14 of the bag 12 against a person's body so that radiant heat emitted from the body can supply the heat needed to distill the water; or heat emitted by hot rocks.

If desired, the panels 14, 16 can each comprise a double layer of the laminated cloth, with the membranes of the cloths arranged face-to-face in the resultant composite membrane arrangement, ie the membranes are then sandwiched between the backing cloths. The membranes are sufficiently tacky or sticky so that they adhere to each other, with the result that water flow through the one membrane continues through the other membrane, in a direction perpendicular to the membranes. One advantage of this composite membrane arrangement is that the integrity of the device is not affected should one of the membranes be flawed or become flawed, e.g. have a pin hole therein. In other words, the composite membrane arrangement will function in the same fashion as a single unflawed or defect-free membrane, albeit at slightly reduced flux.

Referring to FIG. 5, reference numeral 40 generally indicates a portion of a water purification device according to another embodiment of the invention.

Parts of the device 40 which are the same or similar to those of the device 10 are indicated with the same reference numerals.

The device 40 include a canvas membrane 42 adjacent to, and spaced from, the rear portion 30 of the plastics sheet 26. Thus, the membrane 42 and portion 30 of the plastics sheet 26 define an evaporative cooling bag 44.

In use, pure water is introduced into the cooling bag The cooling bag 44 promotes heat transfer to the rear panel 16 of the bag 12, thus improving efficiency.

Referring to FIG. 6, reference numeral 50 generally indicates part of a water purification device according to yet another embodiment of the invention.

Parts of the water purification device 50 which are the same or similar to those of the water purification devices 10, 40 hereinbefore described, are indicated with the same reference numerals.

The device 50 also includes the bag 12, the clear plastics sheet 26, the spacing material 34 and the cooling bag 44. Optionally, the panel 14 of Skinline 8183 can instead be of dark non-permeable plastics material. Intermediate the bag 12 and the cooling bag 44 is located a second membrane bag 52. The membrane bag 52 comprises a single panel 54 of the membrane material, ie the laminated cloth, e.g. Skinline 8183, with the panel 54 being spaced from the rear portion 30 of the plastics sheet 26. A thin layer of the spacing material 34 is provided adjacent the panel 54, with this layer being covered by a clear plastics sheet 56 so that the spacing material 34 provides an air gap between the panel 54 and the plastics sheet 56.

By providing the second membrane bag 52, latent heat of vaporization from the first membrane bag 12/plastics sheet 26 combination is re-used, for greater effectiveness. Thus, as the water vapour condenses on the condensing surface provided by the portion 30 of the plastics sheet 26, the heat of condensation is used to heat up the contaminated water in the second membrane bag 52.

Referring to FIG. 7, reference numeral 100 generally indicates a preheater for use with the devices of FIGS. 1 to 6.

It is to be appreciated that the preheater 100 will thus be connected directly to the membrane bags of the devices 10, 40 and 50, or even formed integrally therewith.

The preheater 100 comprises a black absorbing plastics, eg PVC, base 102, with a clear plastics, e.g. PVC, sheet 104 welded onto the base sheet 102 to form channels 106 for water. A clear dimpled or ridged plastics sheet (not shown) is supported over the sheet 104 to provide spot contact between the dimpled sheet and the sheet 104 so as to reduce heat loss to the environment, e.g. by conduction. Solar radiation passes through the clear sheets, and is absorbed via the base 102. This input of energy causes water in the channels 106 to be heated.

The Applicant believes that the devices 10, 40 and 50, optionally incorporating the preheater 100, provide portable and cheap means for desalinating water, to produce potable water, by utilizing solar energy. In the devices, it was thus surprisingly found that dense hydrophilic members can be used to obtain membrane distillation as described. The devices can thus function at low temperatures below 100° C, and at atmospheric pressure. The devices are simple to operate, and require little or no maintenance. Furthermore, they can fold up into pocket-sized packages, and can thus be utilized by campers, hikers, yachtsman, in agriculture, for survival, etc.

If desired, however, the flexible plastics sheet 26 can be replaced by a rigid plastics plate or panel, which can then be from 5 cm to 10 cm (or more) deep. The inner surface of the panel can then be provided with protrusions in the form of ribs or ridges as hereinbefore described which serve to space the panel from the membrane so that the spacing material 34 can then be dispensed with. A pair of the panels, located respectively on opposite sides of the membrane, can then be used, or, instead, a single panel on one side of the bag only, can be used. The panels, which can be of tray-like form, can be lightweight, so that the device is still easily portable although not necessarily foldable due to the rigidity of the panel(s).

I claim:

1. A water purification device, which comprises a compartment for holding a supply of impure water; a purified water collection zone; a dense hydrophilic membrane between the compartment and the purified water collection zone, the membrane being capable of functioning by membrane distillation; and a water vapor condensing surface defining the purified water collection zone, with the condensing surface spaced from the membrane; wherein the membrane is of flexible radiation-absorbent polymeric material, is laminated to a cloth support, and is in the form of a bag defining the compartment holding said impure water, the bag having front and back panels joined along their peripheries, a base and an upper end having a filler opening leading into the compartment holding said impure water.

2. A device according to claim 1, which includes a plastics cover supported over the bag and spaced therefrom so that the cover provides the condensing surface.

3. A device according to claim 2, which includes a layer of highly porous spacing material in the space between the bag and the cover, with this material abutting the bag and the cover.

4. A device according to claim 2, wherein the cover includes protrusions protruding from its condensing surface so that the protrusions serve to space the cover from the bag.

5. A device according to claim 2, which includes, adjacent a rear portion of the plastics cover covering the rear panel of the bag, a further or second flexible substantially non-porous hydrophilic membrane and a further or second plastic cover supported over this membrane and spaced therefrom, so that a second membrane bag, in addition to the first membrane bag, is defined between the further membrane and the rear portion of the first plastics cover.

6. A device according to claim 5, which includes an evaporative cooling membrane adjacent the second plastics cover.

7. A device according to claim 2, which includes an evaporative cooling membrane adjacent the rear portion of the plastics cover of the membrane bag.

8. A device according to claim 2, which includes a preheater for preheating water introduced into the membrane bag.

9. A device according to claim 8, wherein the preheater is connected to, or is integral with, the membrane bag, with the preheater comprising an absorbent plastics base, and a plastics sheet attached to the base in such fashion that water channels are provided between the sheets.

\* \* \* \* \*